US012627381B2

(12) United States Patent
Viitaniemi et al.

(10) Patent No.: US 12,627,381 B2
(45) Date of Patent: May 12, 2026

(54) SYSTEMS AND METHODS FOR OPTICAL COMMUNICATION ON A PROCESSOR

(71) Applicant: Microsoft Technology Licensing, LLC, Redmond, WA (US)

(72) Inventors: Maria Leena Kyllikki Viitaniemi, Seattle, WA (US); Christian L Belady, Mercer Island, WA (US); Teresa A. Nick, Towson, MD (US); Winston Allen Saunders, Seattle, WA (US); Nicholas Andrew Keehn, Kirkland, WA (US); Eric C. Peterson, Woodinville, WA (US); Vaidehi Oruganti, Kirkland, WA (US); Bharath Ramakrishnan, Bellevue, WA (US); Husam Atallah Alissa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 18/498,439

(22) Filed: Oct. 31, 2023

(65) Prior Publication Data

US 2025/0141566 A1 May 1, 2025

(51) Int. Cl.
| | |
|---|---|
| *H04B 10/00* | (2013.01) |
| *G02B 6/35* | (2006.01) |
| *H04B 10/80* | (2013.01) |

(52) U.S. Cl.
CPC ......... *H04B 10/803* (2013.01); *G02B 6/3538* (2013.01)

(58) Field of Classification Search
CPC .. H04B 10/40; H04B 10/803; H04B 10/2507; H04B 10/801; H04B 10/112; H04B 10/1123; H04B 10/114; H04B 10/1143; H04B 10/1149; G02B 6/3538; G02B 6/4268; G02B 6/4246; G02B 6/43
USPC ....... 398/135, 136, 137, 138, 139, 164, 158, 398/159, 60, 127, 128, 130, 140, 141, 398/118, 119, 129, 131, 79; 385/88, 89, 385/90, 92, 93
See application file for complete search history.

(56) References Cited

U.S. PATENT DOCUMENTS

| | | | | |
|---|---|---|---|---|
| 5,400,419 A * | 3/1995 | Heinen | ................ | G02B 6/4246 398/139 |
| 8,412,052 B2 * | 4/2013 | Mohammed | ............ | H10F 55/25 398/139 |
| 11,639,783 B2 * | 5/2023 | Kiba | ........................ | G02B 7/02 362/235 |
| 2005/0180688 A1 | 8/2005 | Ueno | | |

(Continued)

FOREIGN PATENT DOCUMENTS

WO      2012038843 A1      3/2012

OTHER PUBLICATIONS

International Search Report and Written Opinion received for PCT Application No. PCT/US2024/049695, mailed on Jan. 21, 2025, 17 pages.

*Primary Examiner* — Hanh Phan
(74) *Attorney, Agent, or Firm* — Ray Quinney & Nebeker P.C.; John O. Carpenter

(57) ABSTRACT

A computing device may include a substrate. A computing device may include a processing unit supported by the substrate. A computing device may include an optical transmitter supported by the substrate and in electrical communication with the processing unit.

19 Claims, 9 Drawing Sheets

(56) References Cited

U.S. PATENT DOCUMENTS

| | | | |
|---|---|---|---|
| 2009/0114927 A1* | 5/2009 | Cho | G02B 6/43 |
| | | | 257/E31.109 |
| 2014/0314111 A1 | 10/2014 | Eid | |
| 2016/0187580 A1* | 6/2016 | Vishkin | H01L 23/473 |
| | | | 385/14 |
| 2021/0041649 A1 | 2/2021 | Brusberg | |
| 2023/0268999 A1* | 8/2023 | Kalman | G02B 6/43 |
| | | | 398/135 |
| 2023/0314742 A1 | 10/2023 | Dorta-Quinones | |

* cited by examiner

428

428

SYSTEMS AND METHODS FOR OPTICAL COMMUNICATION ON A PROCESSOR

BACKGROUND

Background and Relevant Art

Conventional processing units and computing devices communicate with other processing units and computing devices through electrical wires and cabling. As the density of compute resources, such as in server configurations and/or in datacenters, increases, the available space for ports and cabling decreases.

BRIEF SUMMARY

In some aspects, the techniques described herein relate to a computing device including: a substrate; a processing unit supported by the substrate; and an optical transmitter supported by the substrate and in electrical communication with the processing unit.

In some aspects, the techniques described herein relate to a computing system including: a substrate; a processing unit supported by the substrate; an optical transmitter supported by the substrate and in electrical communication with the processing unit; an optical receiver supported by the substrate and in electrical communication with the processing unit; and a microfluidic volume in the processing unit and configured to receive electrochemical fluid.

In some aspects, the techniques described herein relate to a computing system including: a substrate; a processing unit supported by the substrate; an optical transmitter supported by the processing unit and in electrical communication with the processing unit; an optical receiver supported by the processing unit and in electrical communication with the processing unit; and a microfluidic volume in the processing unit and configured to receive electrochemical fluid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a perspective view of a first computing device communicating with a second computing device via optical signals, according to at least one embodiment of the present disclosure.

FIG. 2 is a perspective view is a side view of a first computing device and a second computing device arranged in an opposing configuration, according to at least one embodiment of the present disclosure.

FIG. 4-1 is a schematic representation of an electrochemical generator, according to at least one embodiment of the present disclosure.

FIG. 4-2 is a schematic representation of an electrochemical generation system, according to at least one embodiment of the present disclosure.

DETAILED DESCRIPTION

Figure 1:
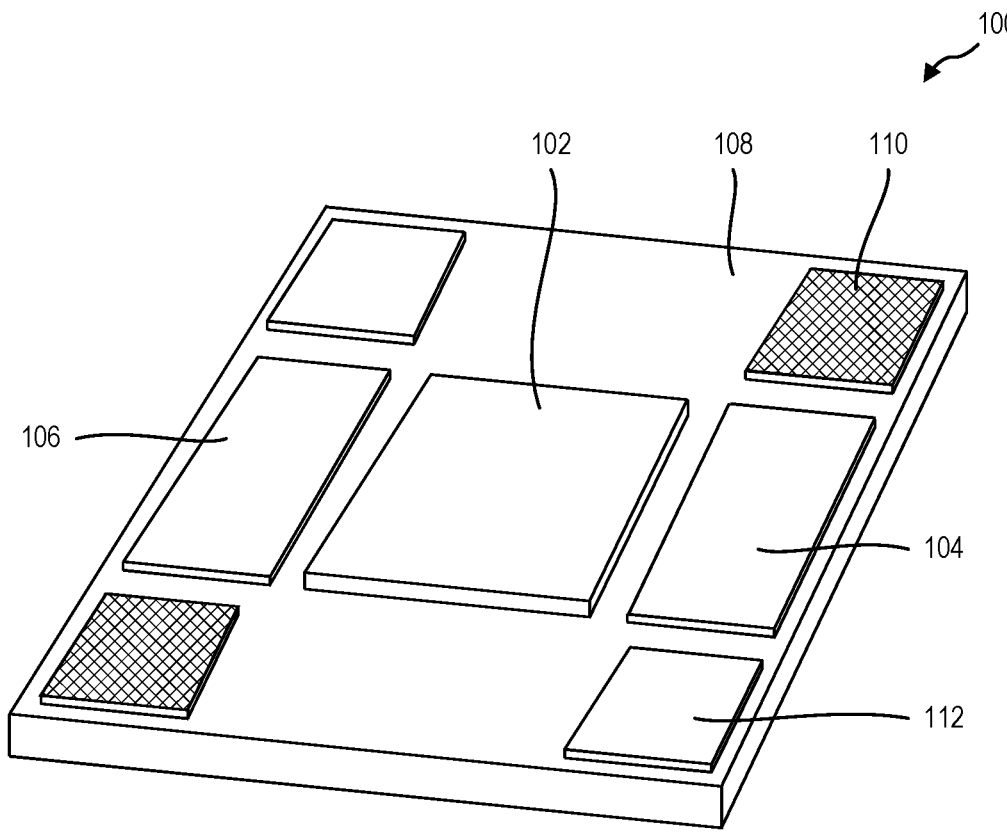
FIG. 1-1 is a perspective view of a computing device including a processing unit, according to at least one embodiment of the present disclosure.

The present disclosure relates generally to systems and methods for data communication in electronic devices, such as packages or processing units in a server computer. More particularly, embodiments according to the present disclosure relate to optical communication for processing units, hardware storage devices, application specific integrated circuits (ASICs), power supplies, system-on-chips (SOCs), networking devices, and other electronic components in a computing device. In an example, a SOC has multiple processors, memory devices, and electronic components facilitating communication between the processors and memory devices. Optical communication, either through open space or via waveguide, can limit or eliminate connections from the architecture of the computing device. Reducing or eliminating connections can simplify cabling, input-output (I/O) architecture, topography, thermal management, and other design constraints of the computing device. For example, optical communication through open space allows communication between adjacent motherboards in a server rack without requiring physical cabling therebetween or additional I/O contacts in existing racks.

A computing device may include at least a processing unit, a memory device, and other electronic components in electrical communication with one another. In some embodiments, the processing unit, memory device, other electronic components, and combinations thereof are supported on a substrate in a single package, such as a SOC or an ASIC. In some embodiments, the processing unit, memory device, other electronic components, and combinations thereof are supported individually by a motherboard that provides electrical or data communication therethrough. The optical transmitter and/or optical receiver allow communication between components on a shared substrate, between components on a package, between components on a motherboard, or between components in different motherboards or in different computing devices. In some embodiments, reducing or eliminating communication I/O ports, cabling, and other parts allows other couplings or connections, such as fluid inlets or outlets for liquid cooling or local liquid power on a die or in other electronic components.

In some embodiments, an optical transmitter is supported by a substrate or motherboard. The optical transmitter may be in data communication with a processing unit or other component of the computing device, such as a memory device or a communication module. In some embodiments, the data communication is an electrical communication such as by copper vias in the substrate or through-silicon vias in a die.

In some embodiments, the optical transmitter includes at least one light source, such as a laser emitter or a light emitting diode (LED). In some embodiments, the optical transmitter includes a plurality or lasers and/or LEDs. For example, the optical transmitter may include at least one laser and at least one LED. In at least one embodiment, the optical transmitter includes an array of light sources that allow for multi-dimensional encoding of data signals. In some embodiments, the array is a one-dimensional array, such as a line of LEDs. In some embodiments, the array is a two-dimensional array, such as a grid of LEDs in a square, a rectangle, a triangle, a circle, an ellipse, or other regular or irregular polygonal or curved shape. For example, a two-dimensional array may be a 64×64 pixel array of microLEDs. The array of light sources allows for spatial data encoding via selective illumination of each light source in addition to temporal encoding with changing light patterns. In some embodiments, the light sources can produce light in more than one wavelength, allowing further density of data encoding.

In some embodiments, an optical transmitter is supported by a substrate or motherboard. The optical transmitter may be in data communication with a processing unit or other component of the computing device, such as a memory device or a communication module. In some embodiments, the data communication is an electrical communication such as by copper vias in the substrate or through-silicon vias in a die. In some embodiments, the data communication is via another component, such as an optical transmitter being in data communication with a processing unit through a communication module.

In some embodiments, the optical transmitter and/or optical receiver is supported by the processing unit. For example, the optical transmitter and/or optical receiver may be coupled to a top surface (opposite a substrate) of the processing unit, a lateral surface (e.g., a side surface between the top surface and the bottom surface contacting the substrate), or a bottom surface (e.g., oriented toward the substrate) to allow optical communication with different components of the computing device or other computing devices. Additionally, some electronic components may have other devices coupled to or connected to the top surface, such as a heat sink, a fluid manifold, or other components for thermal management or power delivery (or generation) to the processing unit or other electronic component.

For example, an optical transmitter and/or optical receiver positioned on a lateral surface (e.g., side) of the processing unit allows the surface area of the top surface to be available for a heat sink, cold plate, or for a microfluidic volume (such as microfluidic channels) for thermal management of the processing unit. In some examples, a microfluidic volume on or in the top surface may allow for electrochemical power generation locally to the processing unit. One or more embodiments of the optical communication systems described herein allow for data communication without interfering with the top surface of the processing unit or other electronic component.

In some embodiments, an optical transmitter and/or optical receiver is positioned on a substrate that is shared with a processing unit. For example, the substrate may be that of the processing unit, or the substrate may be that of a SOC or ASIC including a processing unit. The optical transmitter and/or optical receiver may be in electrical communication with the processing unit or other components of the SOC or ASIC through wires or vias in the substrate. In other examples, the optical transmitter and/or optical receiver is in communication with an optical waveguide to further direct the optical signal from the transmitter or to the receiver. In some embodiments, the optical waveguide is at least partially embedded in the substrate.

FIG. 1 is a perspective view of an embodiment of a computing device 100 including a processing unit 102, a memory device 104, and a communication module 106 or other electronic component on a shared substrate 108. For example, the substrate 108 supports the processing unit 102, a memory device 104, and a communication module 106 or other electronic components relative to one another for electrical and data communication therebetween. In some embodiments, wires, copper vias, and other communication conduits are located on or in the substrate between the components supported thereon.

The term "processing unit" should be interpreted broadly to encompass a general-purpose processor, a central processing unit (CPU), a microprocessor, a digital signal processor (DSP), a controller, a microcontroller, a state machine, and so forth. Under some circumstances, a "processing unit" 102 may refer to a programmable logic device (PLD), a field programmable gate array (FPGA), etc. The term "processing unit" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory device" 104 can refer to any electronic component capable of storing electronic information. Examples of memory include volatile memory and non-volatile memory.

Volatile memory is memory that requires power to maintain the stored information. Volatile memory retains its contents while powered on but loses its contents when the power is interrupted. Some examples of volatile memory include static random-access memory (SRAM) and dynamic random-access memory (DRAM).

Non-volatile memory is memory that can retain stored information even after power is removed. As used herein, the term non-volatile memory can include non-volatile storage. Some examples of non-volatile memory include flash memory, read-only memory (ROM), programmable read-only memory (PROM), erasable programmable read-only memory (EPROM), electrically erasable PROM (EE-PROM), non-volatile RAM, ferroelectric RAM, magnetic computer storage devices (e.g., hard disk drives), optical storage devices, and registers.

In some embodiments, a communication module 106 is supported by the substrate and in communication with at least one of the processing unit 102 and the memory device 104. For example, the communication module 106 may encode or decode communications sent and received by the computing device 100. In some embodiments, the communication module 106 includes an I/O port that allows wired communication. In some embodiments, the communication module 106 includes a radio frequency (RF) transceiver that allows wireless communication via RF transmission. In some embodiments, the communication module 106 encodes and/or decodes optical signals sent by an optical transmitter 110 and/or an optical receiver 112. In some embodiments, the optical transmitter 110 includes or is integrated with the communication module 106. In some embodiments, the optical receiver 112 includes or is integrated with the communication module 106. In some embodiments, the communication module 106 includes or is integrated with both the optical transmitter 110 and the optical receiver 112. In some embodiments, the communication module drives (e.g., supplies a drive current to) the light source(s) of the optical transmitter.

The embodiment of a computing device 100 of FIG. 1 includes a plurality of optical transmitters 110 and a plurality of optical receivers 112. In other embodiments, a computing device according to the present disclosure includes an optical transmitter 110 and not an optical receiver 112. In some embodiments, a computing device according to the present disclosure includes an optical receiver 112 and not an optical transmitter 110. In some embodiments, a computing device according to the present disclosure includes any quantity of optical transmitters 110 and/or optical receivers 112.

Figures 1, 2:
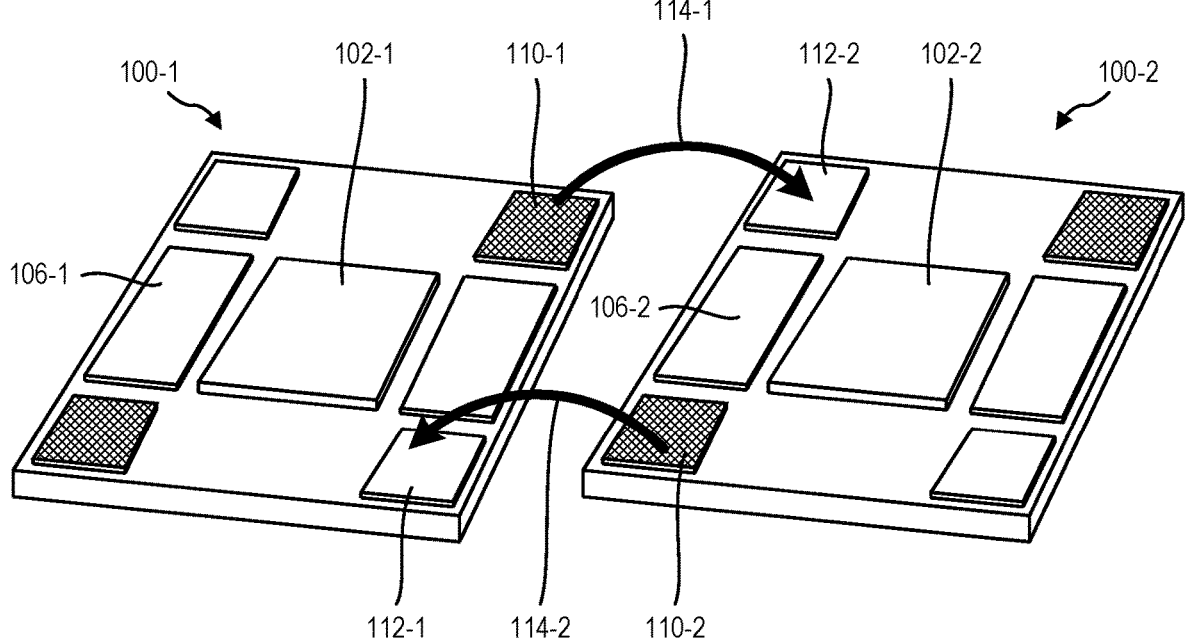
Figure 2:
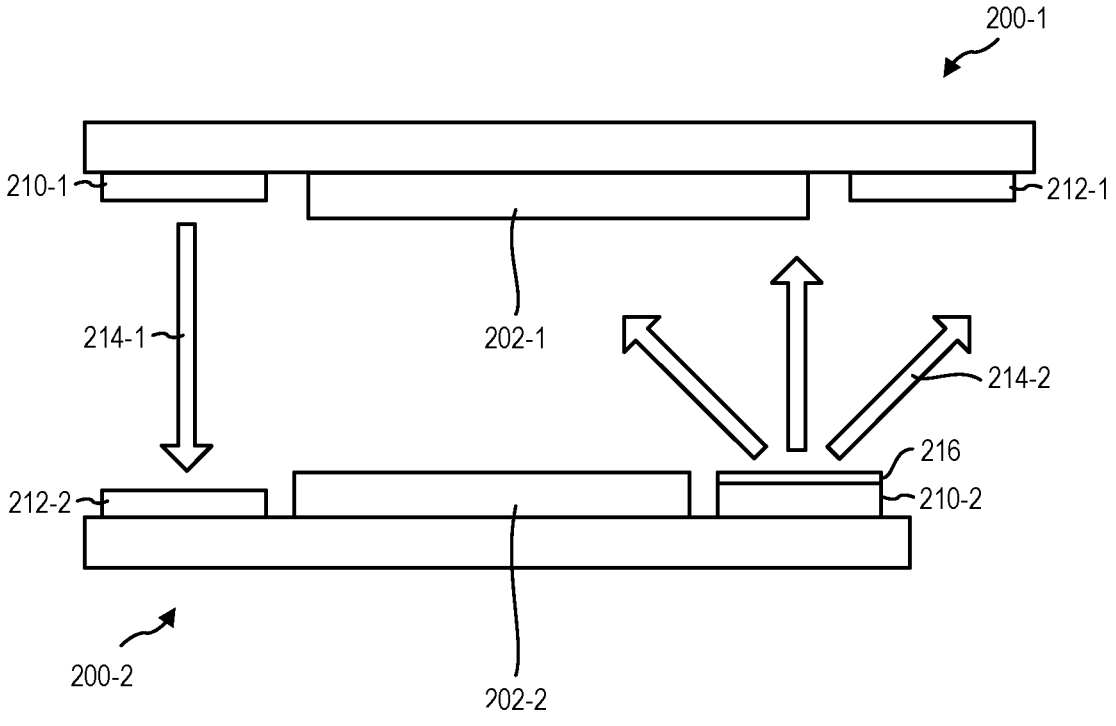

FIG. 1-2 is a perspective view of an embodiment of a first computing device 100-1 communicating with a second computing device 100-2 via optical signals 114-1, 114-2. In some embodiments, the first computing device 100-1 and the second computing device 100-2 include a first optical transmitter 110-1 and a second optical transmitter 110-2, respectively, and the first computing device 100-1 and the second computing device 100-2 include a first optical receiver 112-1 and a second optical receiver 112-2, respectively. The first optical transmitter 110-1 generates a first optical signal 114-1 that is received by the second optical receiver 112-2 and the second optical transmitter 110-2 generates a second optical signal 114-2 that is received by the first optical receiver 112-1.

The first computing device 100-1 and second computing device 100-2, therefore, are in optical communication with one another across open space (e.g., through air or vacuum) without a waveguide therebetween. In a non-limiting example, the first processing unit 102-1 of the first computing device 100-1 may produce a first transmission that is encoded by the first communication module 106-1 and is transmitted by the first optical transmitter 110-1 via the first optical signal 114-1. The second optical receiver 112-2 receives the first optical signal 114-1, and the second communication module 106-2 may decode the first transmission. The second processing unit 102-2 receives the first transmission from the second communication module 106-2 and responds to the first transmission. The second processing unit 102-2 may produce a second transmission that is encoded by the second communication module 106-2 and is transmitted by the second optical transmitter 110-2 via the second optical signal 114-2. The first optical receiver 112-1 receives the second optical signal 114-2, and the first communication module 106-1 may decode the second transmission.

In some embodiments, an optical element is positioned between the optical transmitter and the optical receiver to direct the optical signal therebetween. In some embodiments, a waveguide is present to direct an optical signal between an optical transmitter and an optical receiver. In some embodiments, the waveguide is a flexible waveguide, such as a flexible fiber optic. In some embodiments, the waveguide is a rigid waveguide. In some embodiments, the optical element is a mirror, a prism, a beam splitter, or other optical element that changes a direction of the optical signal. In some embodiments, the optical element is an optical grating that diffuses or directs the optical signal, as will be described in more detail in relation to FIG. 2.

In embodiments in which the first computing device and second computing device are in optical communication through open space with no intervening optical elements (mirrors, waveguides, etc.), an optical transmitter of the first computing device is aligned with an optical receiver of the second computing. In some embodiments, the optical transmitter is aligned with the optical receiver when the optical receiver is positioned substantially normal to a surface of the optical transmitter. In some embodiments, the brightness of the optical signal decreases off-axis from the normal direction of the optical transmitter. In some embodiments, the optical transmitter is aligned with the optical receiver when the optical receiver is positioned proximate to the normal direction of the optical transmitter such that at least 90% of the peak brightness at that distance is received (e.g., the viewing angle of the light source). For example, for a 10-centimeter spacing between the optical transmitter and the optical receiver, the brightness may vary relative to the angle from the normal direction. In some embodiments, an LED exhibits a 90% brightness at approximately 25° from the normal direction. In some embodiments, a laser emitter has a narrower viewing angle. In some embodiments, the optical transmitter is aligned with the optical receiver when the optical receiver is positioned proximate to the normal direction of the optical transmitter such that at least 75% of the peak brightness at that distance is received. In some embodiments, the optical transmitter is aligned with the optical receiver when the optical receiver is positioned proximate to the normal direction of the optical transmitter such that at least 50% of the peak brightness at that distance is received.

For example, FIG. 2 is a side view of an embodiment of a first computing device 200-1 including a first processing unit 202-1 and a second computing device 200-2 including a second processing unit 202-2 in an opposed configuration. The first optical transmitter 210-1 of the first computing device 200-1 is aligned with the second optical receiver 212-2 of the second computing device 200-2. The first optical signal 214-1 is transmitted in a normal direction from the surface of the first optical transmitter 210-1 to the second optical receiver 212-2.

In some embodiments, the optical transmitter and the optical receiver are not directly aligned in the normal direction of the optical transmitter, and an optical element, such as a grating, can direct the signal toward the receiver. In some embodiments, a grating 216 can diffuse the optical signal and create a wider viewing angle, allowing a greater range of positions for the optical receiver to be aligned with the optical transmitter. In some embodiments, an optical receiver is positioned to be aligned with the optical signal after a mirror, prism, lens, or other optical element changes a direction of the optical signal from the normal direction of the optical transmitter.

Referring again to FIG. 2, the second optical transmitter 210-2 of the second computing device 200-2 has an optical grating 216 positioned on a surface thereof to diffuse the second optical signal 214-2. In some embodiments, the first optical receiver 212-2 of the first computing device 212-1 is not positioned directly in the normal direction of the second optical transmitter 210-2 but is aligned with the diffused second optical signal 214-2. In some embodiments, an optical element positioned between the optical transmitter and the optical receiver allows more options for the relative positioning of computing devices and/or pairs of optical transmitters and receivers. In at least one embodiment, a prism or beam splitter positioned in the path of the optical signal splits the optical signal to two or more optical receivers.

Figure 3:
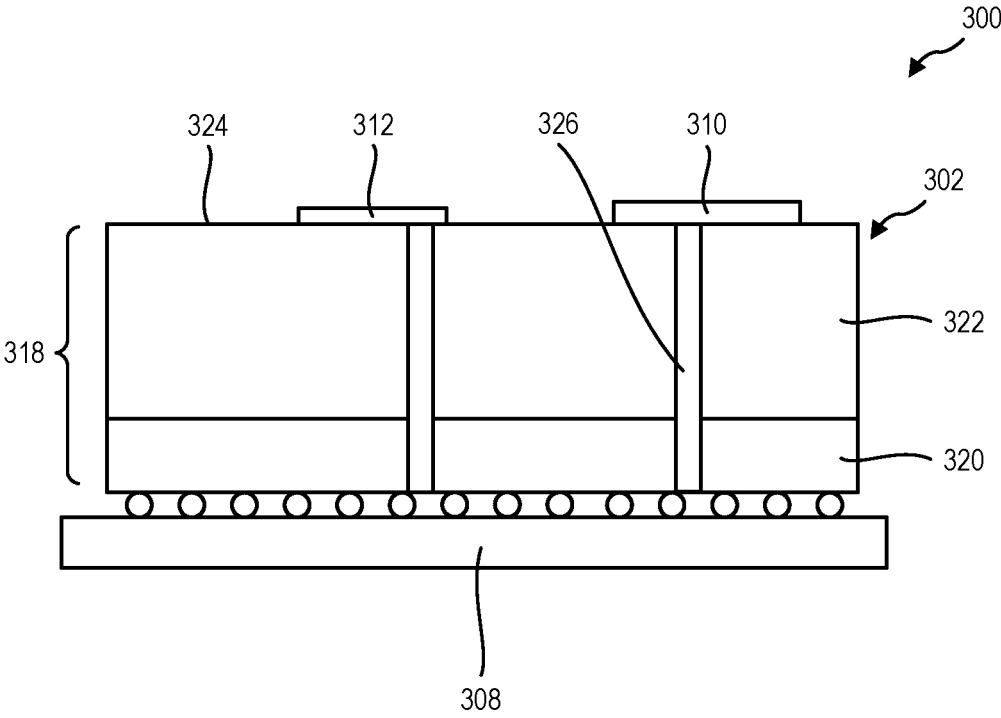
FIG. 3 is a side cross-sectional view of a computing device including a processing unit on a substrate, according to at least one embodiment of the present disclosure.

While embodiments of computing devices with optical transmitters and/or optical receivers supported by a substrate are described in relation to FIG. 1-1 through FIG. 2, in some embodiments, one or both of an optical transmitter and an optical receiver is positioned on a top surface of a processing unit. For example, FIG. 3 is a side cross-sectional view of an embodiment of a computing device 300 including a processing unit 302 on a substrate 308. The processing unit 302 includes a die 318 with an active portion 320 and an inactive portion 322. In some embodiments, an optical transmitter 310 and an optical receiver 312 are supported on a top surface 324 of the processing unit 302 opposite the substrate 308.

In some embodiments, the optical transmitter 310 and/or the optical receiver 312 are in electrical communication with the active portion 320 of the die 318 by through-silicon vias (TSVs) 326. In some embodiments, the TSVs 326 traverse the inactive portion 322 of the die 318 to provide communication between the active portion 320 and the optical transmitter 310 and/or the optical receiver 312 on the top surface 324.

In some embodiments, the top surface 324 of the die 318 and/or processing unit 302 is a relatively large area in the computing device 300 that is available for communications. In some embodiments, the top surface 324 is otherwise occupied by a thermal management device and/or a liquid power delivery device. For example, the top surface 324 may have a heat sink connected thereto that exhausts heat from the processing unit 302. In another example, the top surface 324 may have a fluid manifold connected thereto provides liquid cooling to the die 318. In yet another example, the top surface 324 may have a liquid manifold connected thereto that provides an electrochemical liquid to the die 318 for local power generation at the processing unit 302.

Figures 1, 4:
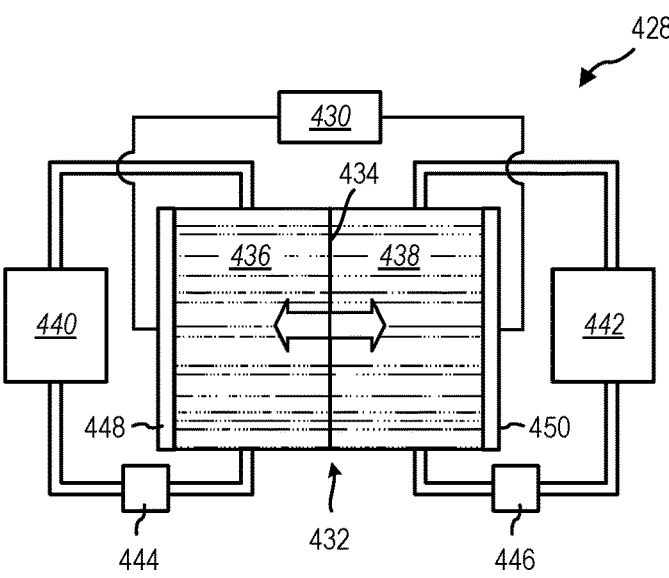
Figures 2, 4:
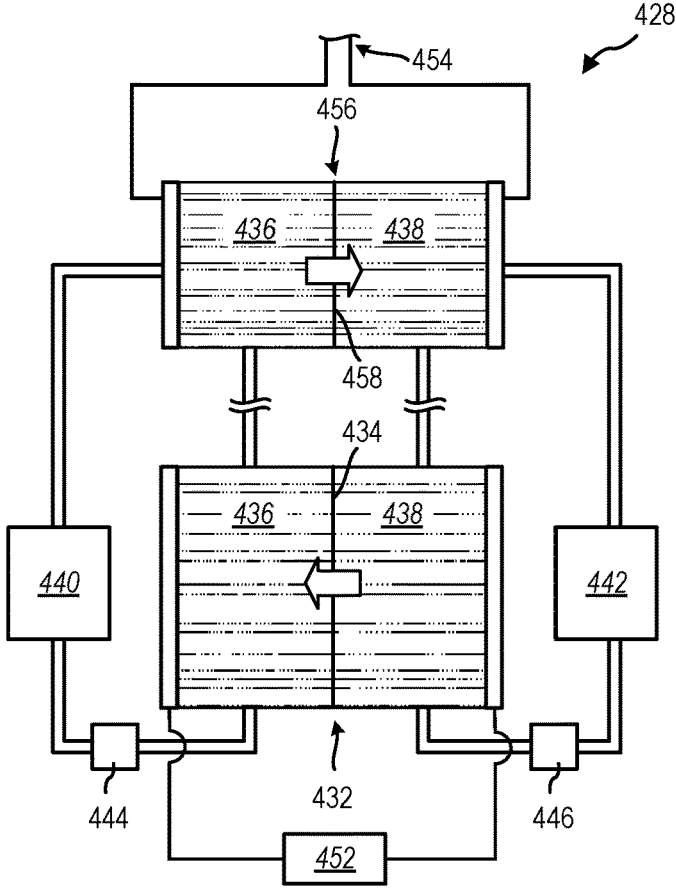

FIG. 4-1 is a schematic view of an electrochemical generation system 428 to provide electrical power to an electrical load 430 (e.g., a processor) or from an electrical source. In some embodiments, an electrochemical generation system 428 includes an electrochemical chamber 432 with an ion-transfer membrane 434 dividing the electrochemical chamber 432. The electrochemical chamber 432 includes a first electrochemical fluid 436 and a second electrochemical fluid 438 separated by the ion-transfer membrane 434. In some embodiments, ion-transfer across the ion-transfer membrane 434 between the first electrochemical fluid 436 and the second electrochemical fluid 438 produces an electric voltage and current to the processor or other electrical load 430 and discharges the first electrochemical fluid 436. In some embodiments, an applied voltage from an electrical source (in place of the electrical load) results in a reverse transfer of ions across the ion-transfer membrane 434 which charges the first electrochemical fluid 436.

In some embodiments, the electrochemical chamber 432 is in fluid communication with a first storage tank 440 and a second storage tank 442. For example, the first electrochemical fluid 436 is stored in the first storage tank 440 and can flow into the electrochemical chamber 432, and the second electrochemical fluid 438 is stored in the second storage tank 442 and can flow into the electrochemical chamber 432. A first pump 444 and second pump 446 may control the flow of the first electrochemical fluid 436 and the flow of the second electrochemical fluid 438, respectively to the electrochemical chamber 432. In some embodiments, the rate of ion-transfer across the ion-transfer membrane 434 is at least partially related to a flow rate of the first electrochemical fluid 436 and the second electrochemical fluid 438 into the electrochemical chamber 432 (and in contact with the ion-transfer membrane 434).

The electrical charge produced by the ion transfer across the ion-transfer membrane 434 may be collected at a first electrode 448 and a second electrode 450 positioned in or on the electrochemical chamber 432 on opposite sides of the ion-transfer membrane 434. For example, a first electrode 448 is in contact with the first electrochemical fluid 436 and a second electrode 450 is in contact with the second electrochemical fluid 438. The electrodes 448, 450 collect charge from the first electrochemical fluid 436 and the second electrochemical fluid 438. In some embodiments, the first electrochemical fluid 436 is an anolyte fluid, and the second electrochemical fluid 438 is a catholyte fluid. In some embodiments, the anolyte fluid and the catholyte fluid is the same fluid or compound in different states of charge. In at least one embodiment, the anolyte fluid and the catholyte fluid are or include a Vanadium salt.

FIG. 4-2 is a schematic illustration of the electrochemical generator system 428 of FIG. 4-1 with a processing unit 452 as the electrical load and a separate electrical source 454 connected to a second electrochemical chamber 456. In some embodiments, an electrochemical generator 428 includes a first electrochemical chamber 432 configured to discharge an electrochemical fluid and provide an electrical power to an electrical load (e.g., the processing unit 452), and the electrochemical generator system 428 includes a second electrochemical chamber 456 configured to receive electrical power from an electrical source 454 (e.g., a power grid or other power source) to recharge the electrochemical fluid 436, 438.

In some embodiments, the electrochemical fluid 436, 438 circulates through the electrochemical generator system 428, receiving electrical power from the electrical source 454 and delivering the electrical power to the electrical load, substantially continuously. In some embodiments, the electrochemical fluid 436, 438 is stored in a storage tank 440, 442 until the electrical power is needed similarly to a battery, when pumps 444, 446 flow the electrochemical fluid 436, 438. As described in relation to FIG. 4-1, a first electrochemical fluid 436 and a second electrochemical fluid 438 exchange ions across a first ion-transfer membrane 434 in the first electrochemical chamber 432 to discharge the first electrochemical fluid 436 and produce electrical power. The first electrochemical fluid 436 and a second electrochemical fluid 438 exchange ions across a second ion-transfer membrane 458 in the second electrochemical chamber 456 to charge the first electrochemical fluid 436 and store electrical power.

In some embodiments, at least a part of the electrochemical chamber configured to provide power is located in a microfluidic volume between dies on a stacked-die processor. For example, a first electrochemical fluid may be positioned in the microfluidic volume. In another example, a second electrochemical fluid may be positioned in the microfluidic volume. In yet another example, both the first electrochemical fluid and the second electrochemical fluid may be positioned in the microfluidic volume.

Figure 5:
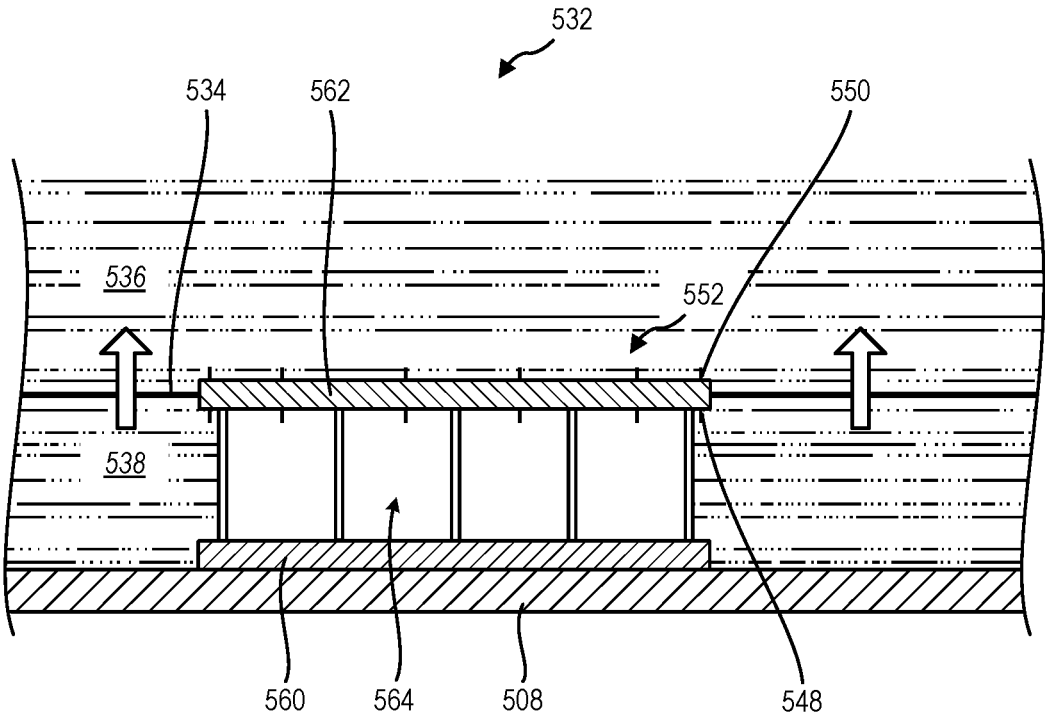
FIG. 5 is a side cross-sectional view of a stacked die processing unit with a first die and a second die with a microfluidic volume positioned therebetween, according to at least one embodiment of the present disclosure.

FIG. 5 is a side cross-sectional view of a stacked die processing unit 552 with a first die 560 and a second die 562 with a microfluidic volume 564 positioned therebetween. In some embodiments, a minimum distance between the first die 560 and the second die 562 may be less than 100 microns. In some embodiments, a minimum distance between the first die 560 and the second die 562 may be less than 200 microns. In some embodiments, a minimum distance between the first die 560 and the second die 562 may be less than 300 microns. In some embodiments, a distance between the first die 560 and the second die 562 is substantially constant across the microfluidic volume 564. For example, the surfaces of the first die 560 and second die 562 that are proximate one another may be substantially planar and parallel. In other embodiments, at least a portion of the surfaces of the first die 560 and second die 562 that are proximate one another is non-planar, and a minimum distance between the first die 560 and second die 562 is defined by the location on the surfaces of the first die 560 and second die 562 that are closest to one another.

In some embodiments, the microfluidic volume 564 of the processing unit 552 is part of the electrochemical chamber 532 configured to provide electrical power through the discharge of the first electrochemical fluid 536 to the second electrochemical fluid 538. For example, an ion transfer across the ion-transfer membrane 534 may generate an electrical potential between the first electrode(s) 548 and the second electrode(s) 550. In at least one example, the first electrochemical fluid 536 is positioned in the microfluidic volume 564 on a first side of the second die 562 and the second electrochemical fluid 538 is positioned on a second side of the second die 562, with the ion-transfer membrane 534 positioned between the first electrochemical fluid 536 and the second electrochemical fluid 538. The second die 562 may be positioned between the first electrodes 548 and second electrodes 550 to receive the electrical power. For example, the first electrochemical fluid 536 may be an anolyte and the second electrochemical fluid 538 may be a catholyte such that the second die 562 (and the circuits thereof) are positioned as the electrical load between the first electrodes 548 in contact with the anolyte and the second electrodes 550 in contact with the catholyte.

In some embodiments, the processing unit 552 is connected to a substrate 508, such as a printed circuit board (PCB). In some embodiments, the processing unit 552 is integrally formed with a silicon wafer. For example, a first die 560 may be integrally formed with a silicon wafer. The first die 560 and the second die 562, separated by the microfluidic volume 564, may be connected by one or more heat transfer structures 566 positioned between the first die 560 and the second die 562. In some embodiments, the heat transfer structures 566 are configured to transfer heat from the first die 560 and/or the second die 562 to the first electrochemical fluid 536 and/or the second electrochemical fluid 538 positioned in the microfluidic volume 564.

While some processors according to the present disclosure have a first electrochemical fluid positioned in the microfluidic volume and a second electrochemical fluid positioned outside of the microfluidic volume, other embodiments of a processor have both the first electrochemical fluid and the second electrochemical fluid positioned in the microfluidic volume. For example, an ion-transfer membrane is positioned in the microfluidic volume to separate the first electrochemical fluid and the second electrochemical fluid. In at least one embodiment, the ion-transfer membrane is a heat transfer structure that allows the movement of ions across and heat through the membrane.

While embodiments described in relation to FIG. 5 may have the second die of the stacked die processing unit at least partially defining a boundary between the electrochemical fluids, in some embodiments, the electrochemical chamber is located between the first die and the second die with a membrane positioned between the first die and the second die. In some embodiments, a processing unit (stacked die or single die) has a cap adjacent a top surface thereof, and at least a portion of the cap and at least a portion of the die define at least a portion of the electrochemical chamber.

Figure 6:
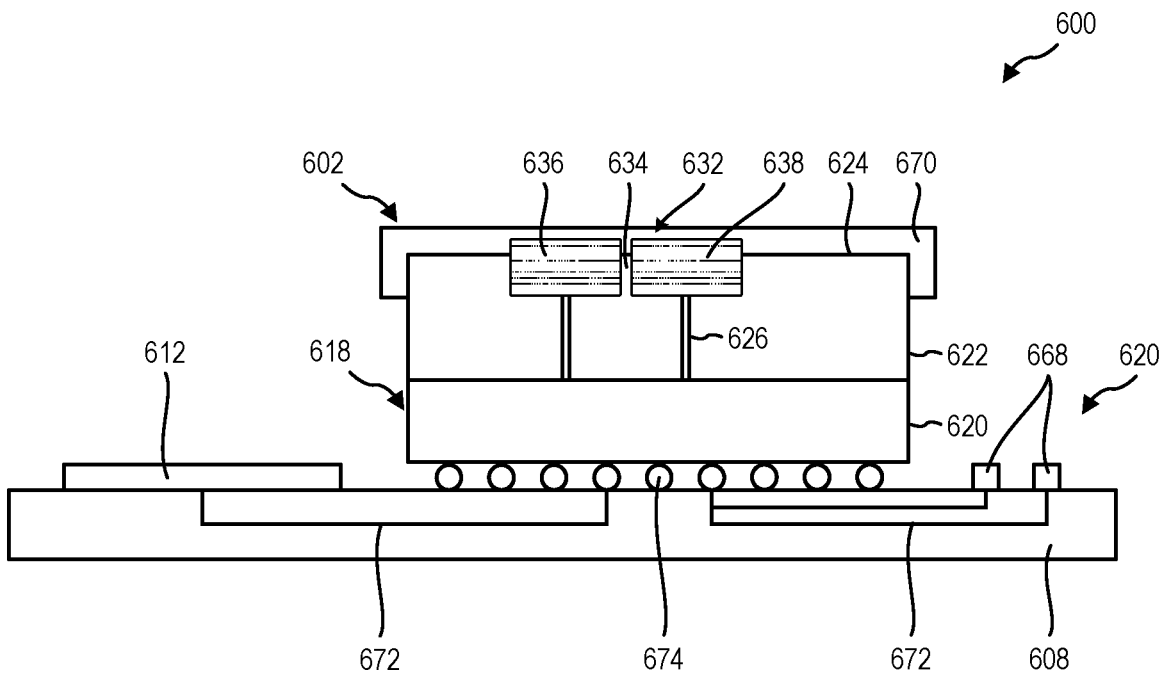
FIG. 6 is a side cross-sectional view of a computing device with on-die electrochemical generation with an optical transmitter and an optical receiver, according to at least one embodiment of the present disclosure.

FIG. 6 is a side cross-sectional view of an embodiment of a computing device 600 with on-die electrochemical generation with an optical transmitter 610 and an optical receiver 612 on a substrate 608 thereon. In some embodiments, the optical transmitter 610 includes a plurality of light sources 668. While the optical transmitter 610 is illustrated as including two light sources 668, as described herein, the optical transmitter may include one light source, a plurality of light sources, a one-dimensional array of light sources, a two-dimensional array or light sources, monochromatic light sources, light sources capable of generating a plurality of wavelengths, and combinations thereof.

In some embodiments, a top surface 624 of the die 618 is encapsulated by a cap 670 that at least partially defines the electrochemical chamber 632 (configured to contain the first electrochemical fluid 636 and the second electrochemical fluid 638) for electrochemical generation on the die 618. The processing unit 602 includes a membrane 634 in the electrochemical chamber 632 that allows ion-transfer between the first electrochemical fluid 636 and the second electrochemical fluid 638. In some embodiments, at least a portion of the membrane 634 includes an inactive portion 622 of the die 618. In some embodiments, at least a portion of the membrane 634 includes part of the cap 670. In some embodiments, the membrane 634 is or includes a discrete membrane material that is different from the die 618 and the cap 670. The ion transfer across the membrane 634 generates electrical power that may be supplied to the active portion 620 of the die 618 by TSVs 626.

The optical transmitter 610 and/or optical receiver 612 are, in some embodiments, positioned on the substrate 608 and in electrical communication with the processing unit 602 (or other electronic components, such as a communications module as described herein) via wires or vias 672 on or embedded in the substrate 608. A wire or via 672 on the substrate 608 is positioned on a surface of the substrate 608 without the wire or via 672 being within the substrate 608. A wire or via 672 is embedded in the substrate 608 when at least a portion of the wire or via 672 is encapsulated within the substrate 608. A wire or via 672 is partially embedded when the wire or via 672 is positioned within a recess in the substrate 608 below a surface of the substrate 608 without being fully encapsulated by the substrate 608.

In some embodiments, the wires or vias 672 are in electrical communication with the processing unit 602 or other electronic components through solder 674 or through a connection port on the substrate 608, such as a processing unit socket. Electrical signals are sent through the wires or vias 672 to drive the light source(s) 668 of the optical transmitter 610 and produce an optical signal. As described herein, an optical element may be connected to the optical transmitter 610 (and/or light sources 668 thereof) to direct the optical signal emitted by the optical transmitter 610.

Figure 7:
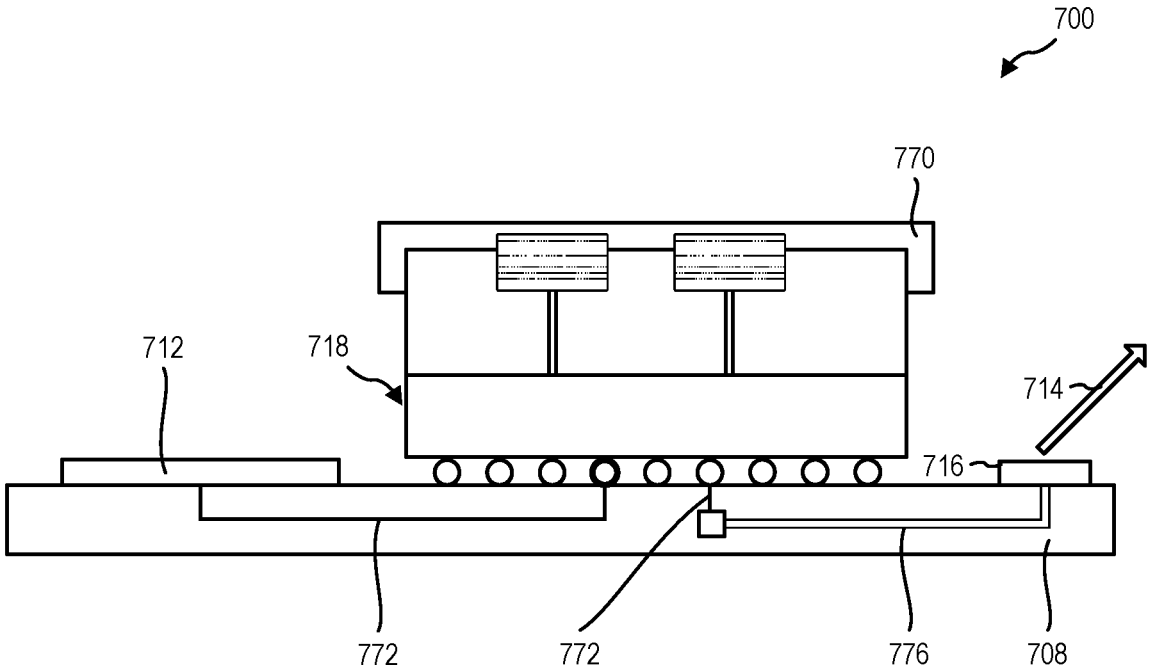
FIG. 7 is a side cross-sectional view of a computing device with an optical element on the substrate to direct the optical signal emitted therefrom, according to at least one embodiment of the present disclosure.

For example, FIG. 7 is a side cross-sectional view of another embodiment of a computing device 700 with an optical element 716 on the substrate 708 to direct the optical signal 714 emitted therefrom. As described in relation to FIG. 6, in some embodiments, a cap 770 is positioned on the die 718 for liquid power generation and/or thermal management, and the optical transmitter 710 and/or optical receiver 712 are in or on the substrate 708.

In some embodiments, the optical transmitter 710 (or a light source thereof) is at least partially embedded in the substrate 708. The optical transmitter 710 may be in optical communication with (e.g., coupled to and directing an optical signal into) a waveguide 776. In some embodiments, the optical transmitter 710 receives an electrical signal through a wire or via 772 to drive the optical transmitter 710 and transmit an optical signal 714 through the waveguide 776 and out of the substrate 708. In some embodiments, the waveguide 776 is embedded in the substrate 708. In some embodiments, the waveguide 776 is at least partially embedded in the substrate 708. In some embodiments, the waveguide 776 is on a surface of the substrate 708.

The waveguide 776 may direct the optical signal 714 out of and away from the substrate 708. In some embodiments, an optical element 716 (such as an optical grating illustrated in FIG. 7) is positioned proximate an end of the waveguide to direct the optical signal 714 toward a target, such as an optical receiver of another computing device.

Figure 8:
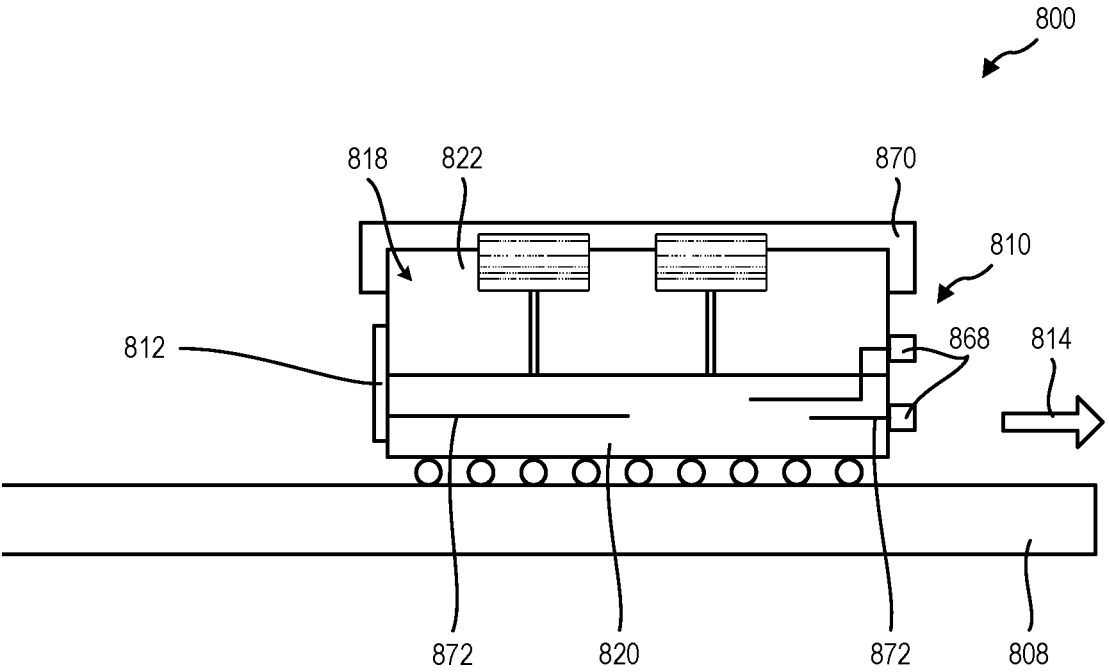
FIG. 8 is a side cross-sectional view of a computing device with a processing unit supporting an optical transmitter and an optical receiver coupled to the lateral surface(s) of the die, according to at least one embodiment of the present disclosure.

In some embodiments, the optical communication from a processing unit or other electronic component is self-contained on the processing unit or other electronic component. For example, FIG. 8 is a side cross-sectional view of a computing device 800 with a processing unit 802 supporting an optical transmitter 810 and an optical receiver 812 coupled to the lateral surface(s) of the die 818.

In some embodiments, an optical transmitter 810 and/or optical receiver 812 coupled to a lateral surface of the die 818 of the processing unit 802 (or lateral surface of the electronic component) allows the top surface of the die 818 and the surface(s) of the substrate 808 to remain available for other purposes, such as a cap 870 for an electrochemical generation system 828 on the die 818 or other electronic components on the substrate 808.

The optical transmitter 810 and/or the optical receive 812 may be coupled to the lateral surface of the die 818 adjacent to an active portion 820 of the die 818, an inactive portion 822 of the die 818, or partially adjacent to the active portion 820 and partially adjacent to the inactive portion 822. For example, the optical transmitter 810 may be positioned on the lateral surface contacting both the active portion 820 and the inactive portion 822 of the die 818. In at least one example, at least one light source 868 is adjacent to the active portion 820 and at least one light source 868 is adjacent to the inactive portion 822. In another example, the optical receiver 812 may be positioned on the lateral surface contacting both the active portion 820 and the inactive portion 822 of the die 818. In some embodiments, the optical transmitter 810 and/or the optical receiver 812 is in electrical communication with the active portion 820 of the die 818 through a wire or via 872 in the die 818.

In some embodiments, the electrochemical generation system 828 provides thermal management of the die 818. The electrochemical generation system 828, therefore, may provide thermal management to the optical transmitter 810 and/or optical receiver 812 positioned on the die 818, as well.

In some embodiments, the optical signal 814 produced by the optical transmitter 810 positioned on a lateral surface is directed at an optical receiver of another computing device or another processing unit optical receiver on the substrate 808 without needing cabling or I/Os between the components and without needing cabling or I/Os on or in the substrate 808.

In at least some embodiments, optical transmitters and/or optical receivers on a die or a substrate of a computing device can allow communication through open space without the need for cabling or additional ports. In some embodiments, the optical transmitter provides multi-dimensional encoding of data, including temporal, spatial (e.g., one-dimensional light source array, two-dimensional light source array), spectral (e.g., multiple wavelengths), and combinations thereof to increase the data density of a transmission.

INDUSTRIAL APPLICABILITY

The present disclosure relates generally to systems and methods for data communication in electronic devices such as packages or processors in a server computer. More particularly, embodiments according to the present disclosure relate to optical communication for processors, hardware storage devices, application specific integrated circuits (ASICs), power supplies, system-on-chips (SOCs), networking devices, and other electronic components in a computing device. In an example, a SOC has multiple processors, memory devices, and electronic components facilitating communication between the processors and memory devices. Optical communication, either through open space or via waveguide, can limit or eliminate connections from the architecture of the computing device. Reducing or eliminating connections can simplify cabling, input-output (I/O) architecture, topography, thermal management, and other design constraints of the computing device. For example, optical communication through open space allows communication between adjacent motherboards in a server rack without requiring physical cabling therebetween or additional I/O contacts in existing racks.

A computing device includes at least a processing unit, a memory device, and other electronic components in electrical communication with one another. In some embodiments, the processing unit, memory device, other electronic components, and combinations thereof are supported on a substrate in a single package, such as a SOC or an ASIC. In some embodiments, the processing unit, memory device, other electronic components, and combinations thereof are supported individually by a motherboard that provides electrical or data communication therethrough. The optical transmitter and/or optical receiver allow communication between components on a shared substrate, between components on a package, between components on a motherboard, or between components in different motherboards or in different computing devices. In some embodiments, reducing or eliminating communication I/O ports, cabling, and other parts allows other couplings or connections, such as fluid inlets or outlets for liquid cooling or local liquid power on a die or in other electronic components.

In some embodiments, an optical transmitter is supported by a substrate or motherboard. The optical transmitter may be in data communication with a processing unit or other component of the computing device, such as a memory device or a communication module. In some embodiments, the data communication is an electrical communication such as by copper vias in the substrate or through-silicon vias in a die.

In some embodiments, the optical transmitter includes at least one light source, such as a laser emitter or a light emitting diode (LED). In some embodiments, the optical transmitter includes a plurality or lasers and/or LEDs. For example, the optical transmitter may include at least one laser and at least one LED. In at least one embodiment, the optical transmitter includes an array of light sources that allow for multi-dimensional encoding of data signals. In some embodiments, the array is a one-dimensional array, such as a line of LEDs. In some embodiments, the array is a two-dimensional array, such as a grid of LEDs in a square, a rectangle, a triangle, a circle, an ellipse, or other regular or irregular polygonal or curved shape. For example, a two-dimensional array may be a 64×64 pixel array of microLEDs. The array of light sources allows for spatial data encoding via selective illumination of each light source in addition to temporal encoding with changing light patterns. In some embodiments, the light sources can produce light in more than one wavelength, allowing further density of data encoding.

In some embodiments, an optical transmitter is supported by a substrate or motherboard. The optical transmitter may be in data communication with a processing unit or other component of the computing device, such as a memory device or a communication module. In some embodiments, the data communication is an electrical communication such as by copper vias in the substrate or through-silicon vias in a die. In some embodiments, the data communication is via another component, such as an optical transmitter being in data communication with a processing unit through a communication module.

In some embodiments, the optical transmitter and/or optical receiver is supported by the processing unit. For example, the optical transmitter and/or optical receiver may be coupled to a top surface (opposite a substrate) of the processing unit, a lateral surface (e.g., a side surface between the top surface and the bottom surface contacting the substrate), or a bottom surface (e.g., oriented toward the substrate) to allow optical communication with different components of the computing device or other computing devices. Additionally, some electronic components may have other devices coupled to or connected to the top surface, such as a heat sink, a fluid manifold, or other components for thermal management or power delivery (or generation) to the processing unit or other electronic component.

For example, an optical transmitter and/or optical receiver positioned on a lateral surface (e.g., side) of the processing unit allows the surface area of the top surface to be available for a heat sink, cold plate, or for a microfluidic volume (such as microfluidic channels) for thermal management of the processing unit. In some examples, a microfluidic volume on or in the top surface may allow for electrochemical power generation locally to the processing unit. One or more embodiments of the optical communication systems described herein allow for data communication without interfering with the top surface of the processing unit or other electronic component.

In some embodiments, an optical transmitter and/or optical receiver is positioned on a substrate that is shared with a processing unit. For example, the substrate may be that of the processing unit, or the substrate may be that of a SOC or ASIC including a processing unit. The optical transmitter and/or optical receiver may be in electrical communication with the processing unit or other components of the SOC or ASIC through wires or vias in the substrate. In other examples, the optical transmitter and/or optical receiver is in communication with an optical waveguide to further direct the optical signal from the transmitter or to the receiver. In some embodiments, the optical waveguide is at least partially embedded in the substrate.

For example, the substrate supports the processing unit, a memory device, and a communication module or other electronic components relative to one another for electrical and data communication therebetween. In some embodiments, wires, copper vias, and other communication conduits are located on or in the substrate between the components supported thereon.

The term "processing unit" should be interpreted broadly to encompass a general-purpose processor, a central processing unit (CPU), a microprocessor, a digital signal processor (DSP), a controller, a microcontroller, a state machine, and so forth. Under some circumstances, a "processing unit" may refer to a programmable logic device (PLD), a field programmable gate array (FPGA), etc. The term "processing unit" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory device" can refer to any electronic component capable of storing electronic information. Examples of memory include volatile memory and non-volatile memory.

Volatile memory is memory that requires power to maintain the stored information. Volatile memory retains its contents while powered on but loses its contents when the power is interrupted. Some examples of volatile memory include static random-access memory (SRAM) and dynamic random-access memory (DRAM).

Non-volatile memory is memory that can retain stored information even after power is removed. As used herein, the term non-volatile memory can include non-volatile storage. Some examples of non-volatile memory include flash memory, read-only memory (ROM), programmable read-only memory (PROM), erasable programmable read-only memory (EPROM), electrically erasable PROM (EE-PROM), non-volatile RAM, ferroelectric RAM, magnetic computer storage devices (e.g., hard disk drives), optical storage devices, and registers.

In some embodiments, a communication module is supported by the substrate and in communication with one or more of the processing unit or the memory device. For example, the communication module may encode or decode communications sent and received by the computing device. In some embodiments, the communication module 106 includes an I/O port that allows wired communication. In some embodiments, the communication module includes a radio frequency (RF) transceiver that allows wireless communication via RF transmission. In some embodiments, the communication module encodes and/or decodes optical signals sent by an optical transmitter and/or an optical receiver. In some embodiments, the optical transmitter includes or is integrated with the communication module. In some embodiments, the optical receiver includes or is integrated with the communication module. In some embodiments, the communication module includes or is integrated with both the optical transmitter and the optical receiver. In some embodiments, the communication module drives (e.g., supplies a drive current to) the light source(s) of the optical transmitter.

In other embodiments, a computing device according to the present disclosure includes an optical transmitter and not an optical receiver. In some embodiments, a computing device according to the present disclosure includes an optical receiver and not an optical transmitter. In some embodiments, a computing device according to the present disclosure includes any quantity of optical transmitters and/or optical receivers.

In some embodiments, a first computing device and a second computing device include a first optical transmitter and a second optical transmitter, respectively, and the first computing device and the second computing device include a first optical receiver and a second optical receiver, respectively. The first optical transmitter generates a first optical signal that is received by the second optical receiver and the second optical transmitter generates a second optical signal that is received by the first optical receiver.

The first computing device and second computing device, therefore, are in optical communication with one another across open space (e.g., through air or vacuum) without a waveguide therebetween. In a non-limiting example, the first processing unit of the first computing device may produce a first transmission that is encoded by the first communication module and is transmitted by the first optical transmitter via the first optical signal. The second optical receiver receives the first optical signal, and the second communication module may decode the first transmission. The second processing unit receives the first transmission from the second communication module and responds to the first transmission. The second processing unit may produce a second transmission that is encoded by the second communication module and is transmitted by the second optical transmitter via the second optical signal. The first optical receiver receives the second optical signal, and the first communication module may decode the second transmission.

In some embodiments, an optical element is positioned between the optical transmitter and the optical receiver to direct the optical signal therebetween. In some embodiments, a waveguide is present to direct an optical signal between an optical transmitter and an optical receiver. In some embodiments, the waveguide is a flexible waveguide, such as a flexible fiber optic. In some embodiments, the waveguide is a rigid waveguide. In some embodiments, the optical element is a mirror, a prism, a beam splitter, or other optical element that changes a direction of the optical signal. In some embodiments, the optical element is an optical grating that diffuses or directs the optical signal.

In embodiments in which the first computing device and second computing device are in optical communication through open space with no intervening optical elements (mirrors, waveguides, etc.), an optical transmitter of the first computing device is aligned with an optical receiver of the second computing. In some embodiments, the optical transmitter is aligned with the optical receiver when the optical receiver is positioned substantially normal to a surface of the optical transmitter. In some embodiments, the brightness of the optical signal decreases off-axis from the normal direction of the optical transmitter. In some embodiments, the optical transmitter is aligned with the optical receiver when the optical receiver is positioned proximate to the normal direction of the optical transmitter such that at least 90% of the peak brightness at that distance is received (e.g., the viewing angle of the light source). For example, for a 10-centimeter spacing between the optical transmitter and the optical receiver, the brightness may vary relative to the angle from the normal direction. In some embodiments, an LED exhibits a 90% brightness at approximately 25° from the normal direction. In some embodiments, a laser emitter has a narrower viewing angle. In some embodiments, the optical transmitter is aligned with the optical receiver when the optical receiver is positioned proximate to the normal direction of the optical transmitter such that at least 75% of the peak brightness at that distance is received. In some embodiments, the optical transmitter is aligned with the optical receiver when the optical receiver is positioned proximate to the normal direction of the optical transmitter such that at least 50% of the peak brightness at that distance is received.

In some embodiments, the first optical transmitter of the first computing device is aligned with the second optical receiver of the second computing device. The first optical signal is transmitted in a normal direction from the surface of the first optical transmitter to the second optical receiver.

In some embodiments, the optical transmitter and the optical receiver are not directly aligned in the normal direction of the optical transmitter, and an optical element, such as a grating, can direct the signal toward the receiver. In some embodiments, a grating can diffuse the optical signal and create a wider viewing angle, allowing a greater range of positions for the optical receiver to be aligned with the optical transmitter. In some embodiments, an optical receiver is positioned to be aligned with the optical signal after a mirror, prism, lens, or other optical element changes a direction of the optical signal from the normal direction of the optical transmitter.

In some embodiments, the second optical transmitter of the second computing device has an optical grating positioned on a surface thereof to diffuse the second optical signal. In some embodiments, the first optical receiver of the first computing device is not positioned directly in the normal direction of the second optical transmitter but is aligned with the diffused second optical signal. In some embodiments, an optical element positioned between the optical transmitter and the optical receiver allows more options for the relative positioning of computing devices and/or pairs of optical transmitters and receivers. In at least one embodiment, a prism or beam splitter positioned in the path of the optical signal splits the optical signal to two or more optical receivers.

In some embodiments, one or both of an optical transmitter and an optical receiver is positioned on a top surface of a processing unit. In some embodiments, the processing unit includes a die with an active portion and an inactive portion. In some embodiments, an optical transmitter and an optical receiver are supported on a top surface of the processing unit opposite the substrate.

In some embodiments, the optical transmitter and/or the optical receiver are in electrical communication with the active portion of the die by through-silicon vias (TSVs). In some embodiments, the TSVs traverse the inactive portion of the die to provide communication between the active portion and the optical transmitter and/or the optical receiver on the top surface.

In some embodiments, the top surface of the die and/or processing unit is a relatively large area in the computing device that is available for communications. In some embodiments, the top surface is otherwise occupied by a thermal management device and/or a liquid power delivery device. For example, the top surface may have a heat sink connected thereto that exhausts heat from the processing
17
18 unit. In another example, the top surface may have a fluid manifold connected thereto provides liquid cooling to the die. In yet another example, the top surface may have a liquid manifold connected thereto that provides an electrochemical liquid to the die for local power generation at the processing unit.

In some embodiments, an electrochemical generation system provides electrical power to an electrical load (e.g., a processor) from an electrical source. In some embodiments, an electrochemical generation system includes an electrochemical chamber with an ion-transfer membrane dividing the electrochemical chamber. The electrochemical chamber includes a first electrochemical fluid and a second electrochemical fluid separated by the ion-transfer membrane. In some embodiments, ion-transfer across the ion-transfer membrane between the first electrochemical fluid and the second electrochemical fluid produces an electric voltage and current to the processor or other electrical load and discharges the first electrochemical fluid. In some embodiments, an applied voltage from an electrical source (in place of the electrical load) results in a reverse transfer of ions across the ion-transfer membrane which charges the first electrochemical fluid.

In some embodiments, the electrochemical chamber is in fluid communication with a first storage tank and a second storage tank. For example, the first electrochemical fluid is stored in the first storage tank and can flow into the electrochemical chamber, and the second electrochemical fluid is stored in the second storage tank and can flow into the electrochemical chamber. A first pump and second pump may control the flow of the first electrochemical fluid and the flow of the second electrochemical fluid, respectively to the electrochemical chamber. In some embodiments, the rate of ion-transfer across the ion-transfer membrane is at least partially related to a flow rate of the first electrochemical fluid and the second electrochemical fluid into the electrochemical chamber (and in contact with the ion-transfer membrane).

The electrical charge produced by the ion transfer across the ion-transfer membrane may be collected at a first electrode and a second electrode positioned in or on the electrochemical chamber on opposite sides of the ion-transfer membrane. For example, a first electrode is in contact with the first electrochemical fluid and a second electrode is in contact with the second electrochemical fluid. The electrodes collect charge from the first electrochemical fluid and the second electrochemical fluid. In some embodiments, the first electrochemical fluid is an anolyte fluid, and the second electrochemical fluid is a catholyte fluid. In some embodiments, the anolyte fluid and the catholyte fluid is the same fluid or compound in different states of charge. In at least one embodiment, the anolyte fluid and the catholyte fluid are or include a Vanadium salt.

In some embodiments, an electrochemical generator system includes a first electrochemical chamber configured to discharge an electrochemical fluid and provide an electrical power to an electrical load (e.g., the processing unit), and the electrochemical generator system includes a second electrochemical chamber configured to receive electrical power from an electrical source (e.g., a power grid or other power source) to recharge the electrochemical fluid.

In some embodiments, the electrochemical fluid circulates through the electrochemical generator system, receiving electrical power from the electrical source and delivering the electrical power to the electrical load, substantially continuously. In some embodiments, the electrochemical fluid is stored in a storage tank until the electrical power is needed similarly to a battery, when pumps flow the electrochemical fluid. In some embodiments, a first electrochemical fluid and a second electrochemical fluid exchange ions across a first ion-transfer membrane in the first electrochemical chamber to discharge the first electrochemical fluid and produce electrical power. The first electrochemical fluid and a second electrochemical fluid exchange ions across a second ion-transfer membrane in the second electrochemical chamber to charge the first electrochemical fluid and store electrical power.

In some embodiments, at least a part of the electrochemical chamber configured to provide power is located in a microfluidic volume between dies on a stacked-die processor. For example, a first electrochemical fluid may be positioned in the microfluidic volume. In another example, a second electrochemical fluid may be positioned in the microfluidic volume. In yet another example, both the first electrochemical fluid and the second electrochemical fluid may be positioned in the microfluidic volume.

In some embodiments, a stacked die processing unit has a first die and a second die with a microfluidic volume positioned therebetween. In some embodiments, a minimum distance between the first die and the second die may be less than 100 microns. In some embodiments, a minimum distance between the first die and the second die may be less than 200 microns. In some embodiments, a minimum distance between the first die and the second die may be less than 300 microns. In some embodiments, a distance between the first die and the second die is substantially constant across the microfluidic volume 564. For example, the surfaces of the first die and second die that are proximate one another may be substantially planar and parallel. In other embodiments, at least a portion of the surfaces of the first die and second die that are proximate one another is non-planar, and a minimum distance between the first die and second die is defined by the location on the surfaces of the first die and second die that are closest to one another.

In some embodiments, the microfluidic volume of the processing unit is part of the electrochemical chamber configured to provide electrical power through the discharge of the first electrochemical fluid to the second electrochemical fluid. For example, an ion transfer across the ion-transfer membrane may generate an electrical potential between the first electrode(s) and the second electrode(s). In at least one example, the first electrochemical fluid is positioned in the microfluidic volume on a first side of the second die and the second electrochemical fluid is positioned on a second side of the second die, with the ion-transfer membrane positioned between the first electrochemical fluid and the second electrochemical fluid. The second die may be positioned between the first electrodes and second electrodes to receive the electrical power. For example, the first electrochemical fluid may be an anolyte and the second electrochemical fluid may be a catholyte such that the second die (and the circuits thereof) are positioned as the electrical load between the first electrodes in contact with the anolyte and the second electrodes in contact with the catholyte.

In some embodiments, the processing unit is connected to a substrate, such as a printed circuit board (PCB). In some embodiments, the processing unit is integrally formed with a silicon wafer. For example, a first die may be integrally formed with a silicon wafer. The first die and the second die, separated by the microfluidic volume, may be connected by one or more heat transfer structures positioned between the first die and the second die. In some embodiments, the heat transfer structures are configured to transfer heat from the first die and/or the second die to the first electrochemical fluid and/or the second electrochemical fluid positioned in the microfluidic volume.

While some processors according to the present disclosure have a first electrochemical fluid positioned in the microfluidic volume and a second electrochemical fluid positioned outside of the microfluidic volume, other embodiments of a processor have both the first electrochemical fluid and the second electrochemical fluid positioned in the microfluidic volume. For example, an ion-transfer membrane is positioned in the microfluidic volume to separate the first electrochemical fluid and the second electrochemical fluid. In at least one embodiment, the ion-transfer membrane is a heat transfer structure that allows the movement of ions across and heat through the membrane.

While embodiments described herein may have the second die of the stacked die processing unit at least partially defining a boundary between the electrochemical fluids, in some embodiments, the electrochemical chamber is located between the first die and the second die with a membrane positioned between the first die and the second die. In some embodiments, a processing unit (stacked die or single die) has a cap adjacent a top surface thereof, and at least a portion of the cap and at least a portion of the die define at least a portion of the electrochemical chamber.

In some embodiments, a computing device has on-die electrochemical generation with an optical transmitter and an optical receiver on a substrate thereon. In some embodiments, the optical transmitter includes a plurality of light sources. As described herein, the optical transmitter may include one light source, a plurality of light sources, a one-dimensional array of light sources, a two-dimensional array or light sources, monochromatic light sources, light sources capable of generating a plurality of wavelengths, and combinations thereof.

In some embodiments, a top surface of the die is encapsulated by a cap that at least partially defines the electrochemical chamber (configured to contain the first electrochemical fluid and the second electrochemical fluid) for electrochemical generation on the die. The processing unit includes a membrane in the electrochemical chamber that allows ion-transfer between the first electrochemical fluid and the second electrochemical fluid. In some embodiments, at least a portion of the membrane includes an inactive portion of the die. In some embodiments, at least a portion of the membrane includes part of the cap. In some embodiments, the membrane is or includes a discrete membrane material that is different from the die and the cap. The ion transfer across the membrane generates electrical power that may be supplied to the active portion of the die by TSVs.

The optical transmitter and/or optical receiver are, in some embodiments, positioned on the substrate and in electrical communication with the processing unit (or other electronic components, such as a communications module as described herein) via wires or vias on or embedded in the substrate. A wire or via on the substrate is positioned on a surface of the substrate without the wire or via being within the substrate. A wire or via is embedded in the substrate when at least a portion of the wire or via is encapsulated within the substrate. A wire or via is partially embedded when the wire or via is positioned within a recess in the substrate below a surface of the substrate without being fully encapsulated by the substrate.

In some embodiments, the wires or vias are in electrical communication with the processing unit or other electronic components through solder or through a connection port on the substrate, such as a processing unit socket. Electrical signals are sent through the wires or vias to drive the light source(s) of the optical transmitter and produce an optical signal. As described herein, an optical element may be connected to the optical transmitter (and/or light sources thereof) to direct the optical signal emitted by the optical transmitter.

in some embodiments, a cap is positioned on the die for liquid power generation and/or thermal management, and the optical transmitter and/or optical receiver are in or on the substrate. In some embodiments, the optical transmitter (or a light source thereof) is at least partially embedded in the substrate. The optical transmitter may be in optical communication with (e.g., coupled to and directing an optical signal into) a waveguide. In some embodiments, the optical transmitter receives an electrical signal through a wire or via to drive the optical transmitter and transmit an optical signal through the waveguide and out of the substrate. In some embodiments, the waveguide is embedded in the substrate. In some embodiments, the waveguide is at least partially embedded in the substrate. In some embodiments, the waveguide is on a surface of the substrate.

The waveguide may direct the optical signal out of and away from the substrate. In some embodiments, an optical element (such as an optical grating) is positioned proximate an end of the waveguide to direct the optical signal toward a target, such as an optical receiver of another computing device.

In some embodiments, the optical communication from a processing unit or other electronic component is self-contained on the processing unit or other electronic component. In some embodiments, computing device has a processing unit supporting an optical transmitter and an optical receiver coupled to the lateral surface(s) of a die.

In some embodiments, an optical transmitter and/or optical receiver coupled to a lateral surface of the die of the processing unit (or lateral surface of the electronic component) allows the top surface of the die and the surface(s) of the substrate to remain available for other purposes, such as a cap for an electrochemical generation system on the die or other electronic components on the substrate.

The optical transmitter and/or the optical receive may be coupled to the lateral surface of the die adjacent to an active portion of the die, an inactive portion of the die, or partially adjacent to the active portion and partially adjacent to the inactive portion. For example, the optical transmitter may be positioned on the lateral surface contacting both the active portion and the inactive portion of the die. In at least one example, at least one light source is adjacent to the active portion and at least one light source is adjacent to the inactive portion. In another example, the optical receiver may be positioned on the lateral surface contacting both the active portion and the inactive portion of the die. In some embodiments, the optical transmitter and/or the optical receiver is in electrical communication with the active portion of the die through a wire or via in the die.

In some embodiments, the electrochemical generation system provides thermal management of the die. The electrochemical generation system, therefore, may provide thermal management to the optical transmitter and/or optical receiver positioned on the die, as well.

In some embodiments, the optical signal produced by the optical transmitter positioned on a lateral surface is directed at an optical receiver of another computing device or another processing unit optical receiver on the substrate without needing cabling or I/Os between the components and without needing cabling or I/Os on or in the substrate.

In at least some embodiments, optical transmitters and/or optical receivers on a die or a substrate of a computing device can allow communication through open space without the need for cabling or additional ports. In some embodiments, the optical transmitter provides multi-dimensional encoding of data, including temporal, spatial (e.g., one-dimensional light source array, two-dimensional light source array), spectral (e.g., multiple wavelengths), and combinations thereof to increase the data density of a transmission.

The present disclosure relates to systems and methods for cooling electronic components and/or devices according to at least the examples provided in the sections below:

Clause 1. A computing device comprising: a substrate; a processing unit supported by the substrate; and an optical transmitter supported by the substrate and in electrical communication with the processing unit.

Clause 2. The computing device of clause 1, wherein the optical transmitter includes an array of light sources.

Clause 3. The computing device of clause 2, wherein the array of light sources is a two-dimensional array.

Clause 4. The computing device of clause 1 or 2, wherein the optical transmitter is configured to transmit an optical signal in a plurality of wavelengths.

Clause 5. The computing device of any preceding clause further comprising an optical receiver supported by the substrate and in electrical communication with the processing unit.

Clause 6. The computing device of any preceding clause, wherein the optical transmitter is coupled to the processing unit.

Clause 7. The computing device of clause 6, wherein the optical transmitter is coupled to a lateral surface of the processing unit.

Clause 8. The computing device of clause 6, wherein the optical transmitter is coupled to a top surface of the processing unit.

Clause 9. The computing device of any preceding clause further comprising an optical element positioned on the optical transmitter and configured to direct an optical signal emitted by the optical transmitter.

Clause 10. The computing device of any preceding clause further comprising an optical waveguide in optical communication with the optical transmitter.

Clause 11. The computing device of clause 10, wherein the optical waveguide is at least partially embedded in the substrate.

Clause 12. The computing device of clause 10, wherein the optical waveguide is a fiber optic.

Clause 13. The computing device of any preceding clause, further comprising a microfluidic volume configured to receive electrochemical fluid.

Clause 14. A computing system comprising: a substrate; a processing unit supported by the substrate; an optical transmitter supported by the substrate and in electrical communication with the processing unit; an optical receiver supported by the substrate and in electrical communication with the processing unit; and a microfluidic volume in the processing unit and configured to receive electrochemical fluid.

Clause 15. The computing system of clause 14, wherein the processing unit includes a first die and a second die, and the microfluidic volume is positioned at least partially between the first die and the second die.

Clause 16. The computing system of clause 14 or 15, wherein the optical receiver is positioned on a lateral surface of the processing unit.

Clause 17. The computing system of any of clauses 14 through 16, wherein the optical transmitter is positioned on a lateral surface of the processing unit.

Clause 18. The computing system of any of clauses 14 or 15, wherein the optical transmitter is connected to the processing unit by a via embedded in the substrate.

Clause 19. The computing system of any of clauses 14 or 15, wherein the optical receiver is connected to the processing unit by a via embedded in the substrate.

Clause 20. A computing system comprising: a substrate; a processing unit supported by the substrate; an optical transmitter supported by the processing unit and in electrical communication with the processing unit; an optical receiver supported by the processing unit and in electrical communication with the processing unit; and a microfluidic volume in the processing unit and configured to receive electrochemical fluid.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device comprising:
a substrate;
a processing unit supported by the substrate, the processing unit including:
a first die,
a second die, and
a microfluidic volume positioned between the first die and the second die; and
an optical transmitter supported by the substrate and in electrical communication with the processing unit.

2. The computing device of claim 1, wherein the optical transmitter includes an array of light sources.

3. The computing device of claim 2, wherein the array of light sources is a two-dimensional array.

4. The computing device of claim 2, wherein the optical transmitter is configured to transmit an optical signal in a plurality of wavelengths.

5. The computing device of claim 1 further comprising an optical receiver supported by the substrate and in electrical communication with the processing unit.

6. The computing device of claim 1, wherein the optical transmitter is coupled to the processing unit.

7. The computing device of claim 6, wherein the optical transmitter is coupled to a lateral surface of the processing unit.

8. The computing device of claim 6, wherein the optical transmitter is coupled to a top surface of the processing unit.

9. The computing device of claim 1 further comprising an optical element positioned on the optical transmitter and configured to direct an optical signal emitted by the optical transmitter.

10. The computing device of claim 1 further comprising an optical waveguide in optical communication with the optical transmitter.

11. The computing device of claim 10, wherein the optical waveguide is at least partially embedded in the substrate.

12. The computing device of claim 10, wherein the optical waveguide is a fiber optic.

13. The computing device of claim 1, further comprising electrochemical fluid in the microfluidic volume.

14. A computing system comprising:
a substrate;
a processing unit supported by the substrate;
an optical transmitter supported by the substrate and in electrical communication with the processing unit;
an optical receiver supported by the substrate and in electrical communication with the processing unit; and
a microfluidic volume in the processing unit and configured to receive electrochemical fluid, wherein the processing unit includes a first die and a second die, and the microfluidic volume is positioned at least partially between the first die and the second die.

15. The computing system of claim 14, wherein the optical receiver is positioned on a lateral surface of the processing unit.

16. The computing system of claim 14, wherein the optical transmitter is positioned on a lateral surface of the processing unit.

17. The computing system of claim 14, wherein the optical transmitter is connected to the processing unit by a via embedded in the substrate.

18. The computing system of claim 14, wherein the optical receiver is connected to the processing unit by a via embedded in the substrate.

19. A computing system comprising:
a substrate;
a processing unit supported by the substrate, wherein the processing unit includes a first die and a second die;
an optical transmitter supported by the processing unit and in electrical communication with the processing unit;
an optical receiver supported by the processing unit and in electrical communication with the processing unit; and
a microfluidic volume in the processing unit and configured to receive electrochemical fluid and the microfluidic volume is positioned between the first die and the second die.

* * * * *